(12) United States Patent
Landrou et al.

(10) Patent No.: US 11,905,211 B2
(45) Date of Patent: Feb. 20, 2024

(54) CONSTRUCTION MATERIAL WITHOUT A HYDRAULIC BINDER

(71) Applicant: ETH ZÜRICH, Zürich (CH)

(72) Inventors: Gnanli Landrou, Zürich (CH); Coralie Brumaud, Bienne (CH); Guillaume Habert, Zürich (CH)

(73) Assignee: ETH Zurich, Zurich (CH)

( * ) Notice: Subject to any disclaimer, the term of this patent is extended or adjusted under 35 U.S.C. 154(b) by 239 days.

(21) Appl. No.: 17/275,325

(22) PCT Filed: Sep. 11, 2019

(86) PCT No.: PCT/EP2019/074261
§ 371 (c)(1),
(2) Date: Mar. 11, 2021

(87) PCT Pub. No.: WO2020/053297
PCT Pub. Date: Mar. 19, 2020

(65) Prior Publication Data
US 2022/0048818 A1 Feb. 17, 2022

(30) Foreign Application Priority Data
Sep. 12, 2018 (EP) .................................... 18193997

(51) Int. Cl.
| | | |
|---|---|---|
| *C04B 14/36* | (2006.01) | |
| *C04B 14/10* | (2006.01) | |
| *C04B 24/26* | (2006.01) | |
| *C04B 103/00* | (2006.01) | |
| *C04B 103/40* | (2006.01) | |
| *C04B 103/44* | (2006.01) | |
| *C04B 111/70* | (2006.01) | |

(52) U.S. Cl.
CPC ............ *C04B 14/361* (2013.01); *C04B 14/10* (2013.01); *C04B 24/2641* (2013.01); *C04B 2103/0067* (2013.01); *C04B 2103/408* (2013.01); *C04B 2103/44* (2013.01); *C04B 2111/70* (2013.01)

(58) Field of Classification Search
CPC ... C04B 14/361; C04B 14/10; C04B 24/2641; C04B 28/186; C04B 28/24; C04B 30/00; C04B 2103/0067; C04B 2103/408; C04B 2103/44; C04B 2111/70; C04B 2201/50
See application file for complete search history.

(56) References Cited

U.S. PATENT DOCUMENTS 4,444,594 A  4/1984 Paddison et al.

FOREIGN PATENT DOCUMENTS

| CN | 107686367 A | * | 2/2018 | ............. C04B 28/00 |
| SU | 1217836 A | * | 3/1986 | ............. C04B 28/02 |
| WO | 9322254 A1 | | 11/1993 | |
| WO | 2015155110 A1 | | 10/2015 | |

OTHER PUBLICATIONS

ACI Committee 330, Guide for Design and Construction of Concrete Parking Lots, Jan. 1, 2001, Retrieved from the Internet: http://cdnassets.hw.net/f5/ba/26e60e01418e827a125ac4d41b1a/aci-330-design-guide-for-concrete-parking-lots-tcm77-2204806.pdf, 32 pgs.
PCT International Search Report and Written Opinion; Application No. PCT/EP2019/074261, filing date of Sep. 11, 2019, dated Oct. 11, 2019, 11 pages with translation of International Search Report.

* cited by examiner

*Primary Examiner* — Anthony J Green
(74) *Attorney, Agent, or Firm* — Patent Law Works LLP

(57) ABSTRACT

The invention relates to a method for producing a solid construction material which is preferably substantially free of hydraulic binder, comprising the steps of: a. extracting a mineral fraction comprising argillaceous particles of a soil; b. optionally adjusting the particle size of the mineral fraction extracted, in particular in relation to its clay, sand, gravel or loam content, if necessary; c. preparing a first aqueous grout from at least one part of the mineral fraction extracted and optionally adjusted in terms of particle size; d. adding a dispersant that can disperse the argillaceous particles in the first grout in order to obtain a second aqueous grout, e. adding a coagulant that can promote the agglomeration of the argillaceous particles in the second grout in order to obtain an aqueous construction material grout; f introducing the construction material grout into a formwork; and g. allowing the evaporation of the water contained in the material grout in order to obtain a solid construction material.

17 Claims, 3 Drawing Sheets

CONSTRUCTION MATERIAL WITHOUT A HYDRAULIC BINDER

CROSS REFERENCE TO RELATED APPLICATIONS

This application is a national phase entry under 35 U.S.C. § 371 of International Patent Application PCT/EP2019/074261, filed Sep. 11, 2019, designating the United States of America and published in English as International Patent Publication WO 2020/053297 on Mar. 19, 2020, which claims the benefit under Article 8 of the Patent Cooperation Treaty to European Patent Application Serial No. 18193997.6, filed Sep. 12, 2018, the entireties of which are hereby incorporated by reference.

FIELD OF THE INVENTION

The present invention relates to construction materials that can be obtained from soil, to the extent that the soil contains argillaceous particles, without addition of hydraulic binder.

STATE OF THE ART

In the field of construction, the most utilized inorganic construction material is concrete, i.e. the combination of aggregates with a hydraulic binder. However, the use of a hydraulic binder, like for example cement, poses a problem in terms of infrastructure because the production of cement necessitates important quantities of energy as well as the presence of a cement factory, which drives consiterable monetary costs and environmental costs. It is therefore preferable to reduce the use of such hydraulic binders to a minimum to thereby reduce the cost of construction. In the ideal case, it is preferable to provide a construction material that can be obtained with naturally present resources, in proximity to the construction site, using a minimum of auxiliary products. However, it is equally important that such a construction material presents handling similar to concrete grout or cement, as well as a similar setting behaviour to concrete grout, such as not to require adapting procedures and/or tools for construction which were initially developed for hydraulic binder grouts such as cement.

SUMMARY OF THE INVENTION

The present invention provides a method for producing a solid construction material, preferably essentially free of hydraulic binders such as cement, that allows and facilitates the use of soil in the fabrication of construction material with a minimum of auxiliary products and without necessity of having to add hydraulic binders.

The method allows furthermore to obtain a construction material which, in its fluid state can be used analogously to cement grouts, in terms of rheology and setting time, which allows for example the production of solid construction materials such as supporting construction elements on-site, or in situ, of the construction site.

The present invention therefore provides a method for producing a solid construction material, which is preferably substantially free of a hydraulic binder, comprising the steps of:
 a. extracting a mineral fraction comprising argillaceous particles from a soil;
 b. optionally adjusting the granulometry of the mineral fraction extracted, in particular with respect to its clay, sand, gravel or loam content,
 c. preparing a first aqueous grout from at least one part of the mineral fraction extracted and optionally adjusted in terms of granulometry;
 d. adding a dispersing agent capable of dispersing the argillaceous particles to the first grout in order to obtain a second aqueous grout,
 e. adding a coagulating agent capable of promoting the agglomeration of the argillaceous particles in the second aqueous grout in order to obtain an aqueous construction material grout;
 f. introducing the aqueous construction material grout into a formwork; and
 g. allowing the evaporation of the water contained in the material grout in order to obtain a solid construction material,
 characterized in that the solid construction material is a supporting element having a compressive strength of at least 1.4 MPa.

The present invention further provides a solid construction material obtained by the method according to any one variants of the above-mentioned method, having a compressive strength of at least 1.4 MPa.

Preferred embodiments of the present invention are described in the dependent claims.

DESCRIPTION OF PREFERRED EMBODIMENTS

Figure 1:
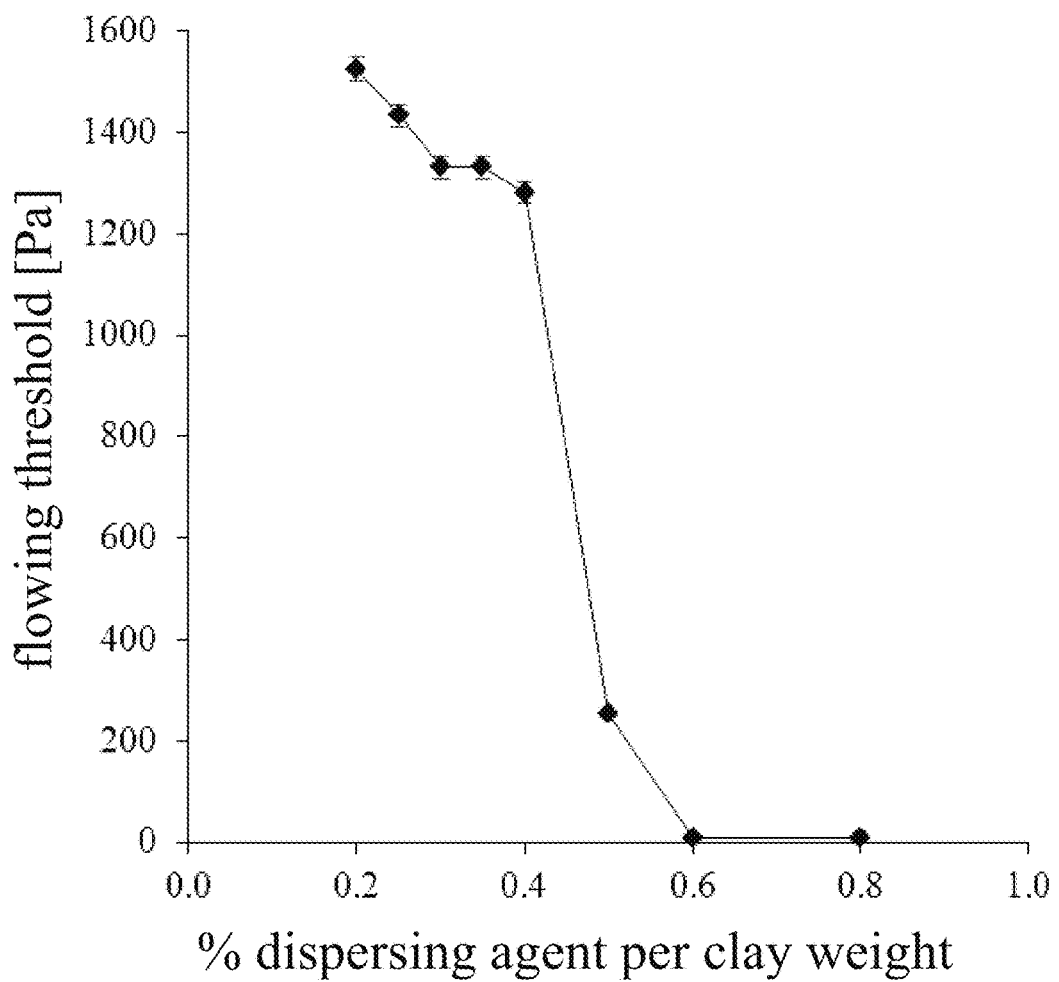
FIG. 1 shows the evolution of the flowing threshold depending on the content of dispersing agent in the grout.
Figure 2:
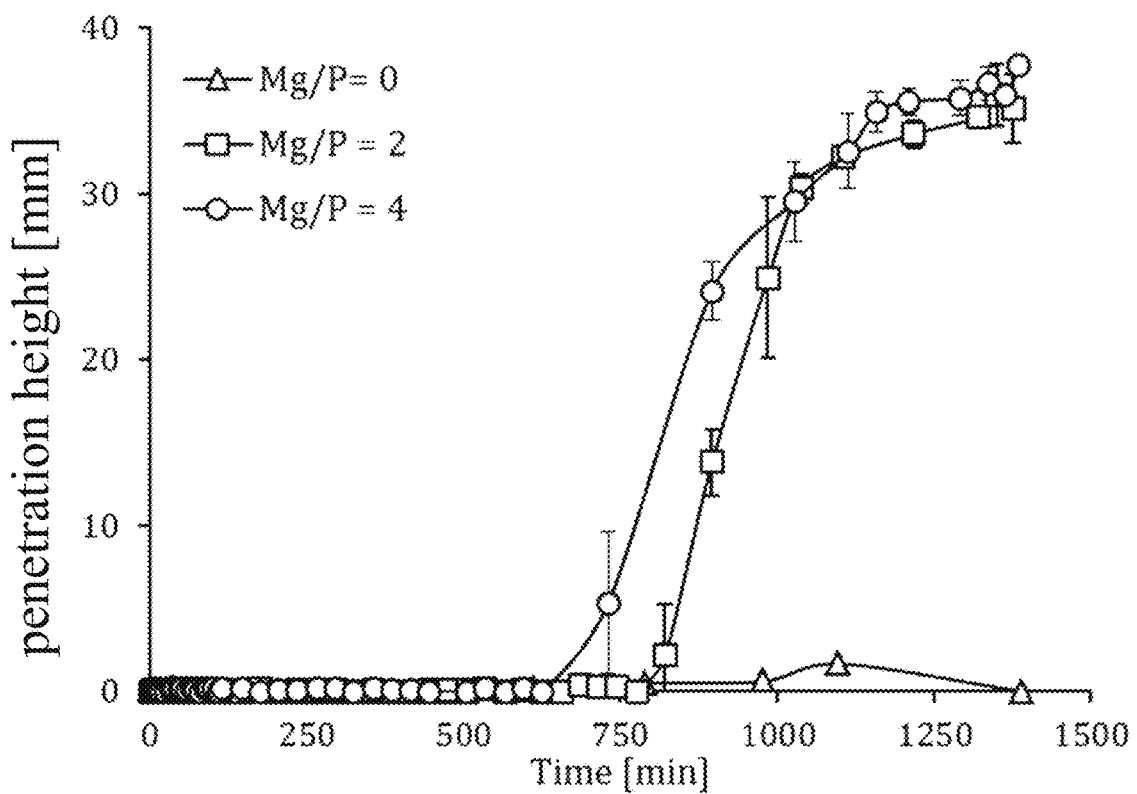
FIG. 2 shows the evolution of the penetration height of the VICAT needle depending on time.
Figure 3:
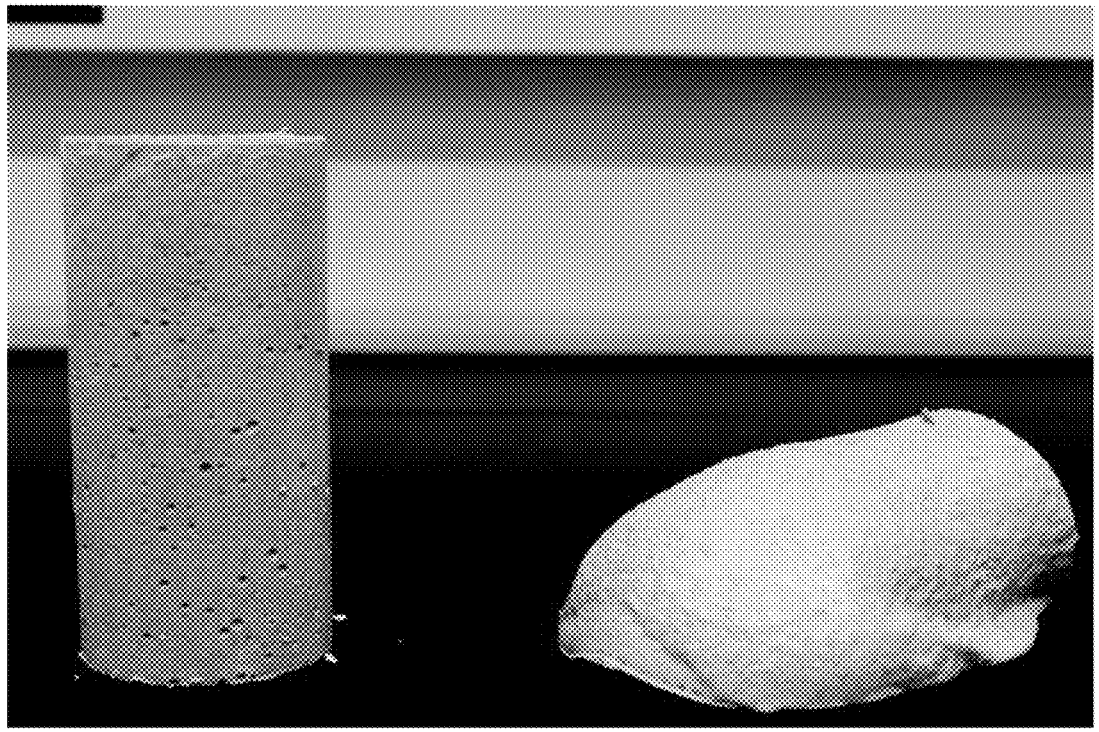
FIG. 3 shows the effect of the coagulating agent based on magnesium on the grout after 24 hours, in a grout without magnesium (left) and one with magnesium (right).
Figure 4:
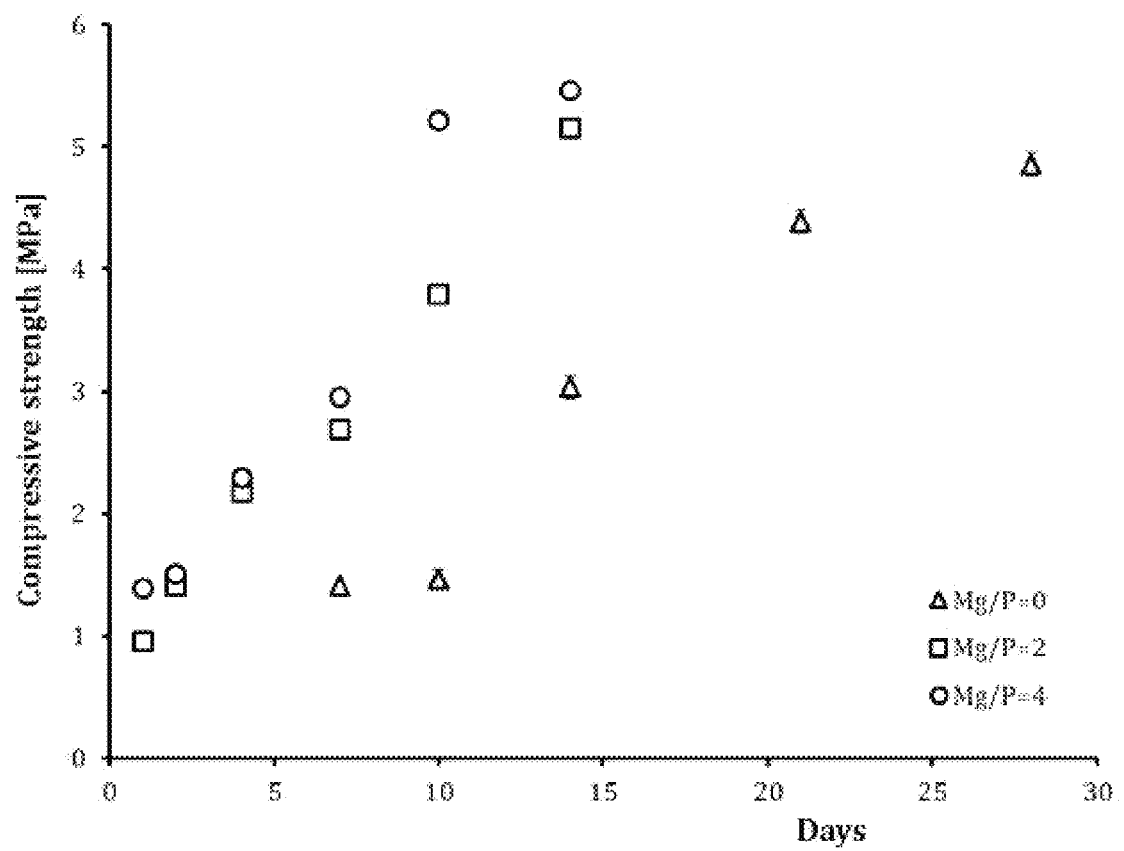
FIG. 4 shows the evolution of compression strength depending on time, i.e. depending on the degree of drying.

The present invention therefore provides a method for the production of a solid construction material, preferably essentially free of hydraulic binders such as cement, lime or pozzolan, comprising the steps of:
 a. extracting a mineral fraction comprising argillaceous particles from a soil;
 b. optionally adjusting the granulometry of the mineral fraction extracted, in particular with respect to its clay, sand, gravel or loam content,
 c. preparing a first aqueous grout from at least one part of the mineral fraction extracted and optionally adjusted in terms of granulometry;
 d. adding a dispersing agent capable of dispersing the argillaceous particles to the first grout in order to obtain a second aqueous grout,
 e. adding a coagulating agent capable of promoting the agglomeration of the argillaceous particles in the second aqueous grout in order to obtain an aqueous construction material grout;
 f. introducing the aqueous construction material grout into a formwork; and
 g. allowing the evaporation of the water contained in the material grout in order to obtain a solid construction material, characterized in that the solid construction material is a supporting element having a compressive strength of at least 1.4 MPa.

The extraction of the mineral fraction comprising argillaceous particles from the soil can be carried out on site, for example by means of soil excavation, which circumvents the necessity of having to transport mineral materials such as additional clays, loams, gravels or sands to the construction site or production site. The argillaceous particles are preferably particles having a size inferior to 4 micrometres, more preferably to 2 micrometres, according to the norm NF P18-560. The argillaceous particles are preferably hydrated aluminosilicate particles, more preferably chosen among the family of phyllosilicates, such as kaolinite. The necessary technologies for obtaining a mineral fraction are available to the person skilled in the art in the field of construction materials.

The adjusting of the granulometry of the mineral fraction extracted can be carried out on site by means of sieving or sedimentometry of the extracted mineral fraction or when the granulometry of the locally extracted mineral fraction requires it, it is possible to complete the composition of the mineral fraction by addition of supplementary mineral fractions to arrive at the desired granulometry, such as loam, sand, gravel or stones. The content of the mineral fraction in terms of loam, sand, gravel or stones will depend on the requirements of the construction material and of its considered use.

A useful composition of the mineral fraction comprises about 5 to 30 weight percent of argillaceous particles, preferably 10 to 25 weight percent of argillaceous particles, 5 to 10 weight percent of loam, 25 to 55 weight percent of sand and 20 to 47 weight percent of gravel, with respect to the total dry weight of the mineral material contained in the mineral fraction.

The production of the first aqueous grout from at least a part of the extracted mineral fraction, which was optionally adjusted with respect to its granulometry, can be carried out by mixing at least a part of the extracted mineral fraction to an aqueous solution or to water, for example in a concrete mixer. The amount of water can be varied according to the considered use and is in general chosen such that the grout is fluid. For example a ratio of water/mineral fraction between 0.1 and 0.6. Or a ratio of water/mineral fraction such that a fluidity in terms of spread after vibration of between 30 cm and 50 cm is obtained.

The addition of a dispersing agent, capable of dispersing the argillaceous particles, to the first grout in order to obtain a second aqueous grout, is preferably carried out when the first aqueous grout has been mixed while keeping the mixing action running. The addition can be made either by adding the dispersing agent in a solid form or in the form of a aqueous dispersion or aqueous solution. The dispersing agent capable of dispersing the argillaceous particles is preferably chosen among aluminates, phosphates, silicate solutions and polyacrylate salts, such as monovalent salts thereof. A useful dispersing agent chosen among phosphates is sodium hexametaphosphate. A useful dispersing agent chosen among silicates is sodium silicate solution. A useful dispersing agent chosen among polyacrylate salts is sodium polyacrylate. It is important to choose the dispersing agent among monovalent salts, preferably among alkaline metal salts such as sodium or potassium and not amongst alkaline earth metals which are divalent. The addition of the dispersing agent to the first grout allows to obtain a grout having an increased fluidity, i.e. to say a flowing threshold of less than 1000 Pa, preferably of less than 250 Pa. It is understood that this allows a reduction of the addition of water necessary to arrive at a given flowing threshold of the grout when compared to a grout that does not comprise dispersing agent. When the flowing threshold is inferior to 1000 Pa, the grout becomes more easily worked, molded, formworked and pumped. The flowing threshold of less than 1000 Pa may be achieved by the addition of less than 2 weight percent, preferably from 0.1 to 0.5 weight percent of dispersing agent with respect to the total dry weight of the mineral material or from 0.4 to 2 weight percent of dispersing agent with respect to the total dry weight of clays. In particular, the dispersing agent can be chosen among sodium polyphosphate, sodium hexametaphosphate, sodium silicate, sodium polyacrylate and ammonium polyacrylate. In a preferred embodiment of the present invention, the dispersing agent is constituted by a mixture of at least a phosphate and at least a silicate, more preferably by a mixture of sodium hexametaphosphate and sodium silicate.

The addition of a coagulating agent capable of bringing about the agglomeration of the argillaceous particles to the second grout in order to obtain a aqueous construction material grout, is preferably carried out when the second aqueous grout has reached a flowing threshold of less than 1000 Pa and more preferably when the second aqueous grout has reached a flowing threshold of less than 1000 Pa and before the formworking of the grout of the construction material of the aqueous construction material grout.

The addition of the coagulating agent allows to accelerate the setting of the aqueous construction material grout by freeing the divalent ions, such as calcium, which have the capacity to form precipitations such as crystals, which can augment the mechanical properties such that the compression strength in the final construction material. The solubility of the coagulating agent can be exploited to control the setting speed of the construction material grout in order to optimize the progress of the construction process. When a fast setting, i.e. within a period of less than an hour, is desirable, the coagulating agent is preferably chosen among nitrates and halides such as chlorides of earth alkaline metals such as for example magnesium chloride or calcium or even further calcium nitrate or magnesium nitrate. However when a prolonged workability, i.e. beyond an hour and preferably beyond four hours is desired, the coagulating agent is preferably chosen amongst oxides, hydroxides and carbonates and sulphates of alkaline earth metals, such as for example magnesium or calcium oxide, calcium or magnesium hydroxide, or calcium or magnesium carbonate.

For example, in the case where the dispersing agent is chosen amongst silicates such as for example sodium silicate and the coagulating agent is chosen among salts of alkaline earth metals such as calcium oxide, the precipitations manifest as hydrated calcium silicate crystals such as plomberite. In the case where the dispersing agent is chosen among phosphates such as hexa metaphosphates and the coagulating agent, is chosen among salts of alkaline earth metals such as calcium oxide, the precipitations manifest as hydrated calcium silicate crystals such as apatite. Similarly, when the dispersing agent is chosen among phosphates such as hexametaphosphate and the coagulating agent is chosen among salts of alkaline earth metals such as magnesium oxide, the precipitations manifest as magnesium silicate crystals. Without wishing to adhere to a singular theory, it is believed that the rapid rise in compression strength, which is realized in the aqueous construction material grouts shortly after the addition of the coagulating agent and during the drying, can be attributed to the formation of the precipitations which consume the dispersing agent present in the aqueous construction material grout and eliminate the electrostatic repulsion caused by the adsorption of the dispersing agent on the argillaceous particles. The rapid rise in compression strength, which is realized in the aqueous construction material grouts shortly after the addition of the coagulating agent and during the drying allows to shorten the necessary time for producing a construction material element.

In general, the coagulating agent is preferably chosen among inorganic salts having a divalent metallic cation such as for example iron or earth alkaline metals, carbonates, chlorides, nitrates, sulphates, oxides or hydroxides, more preferably of alkaline earth metal salts carbonates, chlorides, nitrates, sulphates, oxides or hydroxides. In particular the coagulating agent can be chosen among calcium carbonate, calcium chloride, calcium nitrate, calcium sulphate, calcium hydroxide, magnesium oxide, magnesium hydroxide, magnesium carbonate, magnesium sulphate, cement or calcium sulpho-aluminate based cement.

In a preferred embodiment of the present invention, the dispersing agent is constituted by at least a phosphate, at least a silicate, or mixtures thereof, more preferably of sodium hexametaphosphate, of sodium silicate or a mixture of sodium hexametaphosphate and sodium silicate and/or the coagulating agent is constituted of magnesium oxide, calcium hydroxide or a mixture of magnesium oxide and calcium hydroxide.

The addition of the coagulating agent can be made either by adding the coagulating agent in a solid form or in form of an aqueous dispersion or solution, and when a rapid setting, i.e. within a period of less than an hour is desired, the coagulating agent is added in the form of a aqueous solution in the case where it is a halide or in the case where the coagulating agent is preferably chosen amongst oxides, hydroxides and carbonates, and sulphates in the form of solid particles having a specific surface of at least 20 m²/g or in the form of an aqueous dispersion of the same solid particles.

In general, the coagulating agent can be issued from the extraction of the corresponding minerals in a quarry. Even though the minerals contain a majority of the coagulating agent, these minerals equally contain impurities that can interfere with the coagulating action and it is therefore preferable to use coagulating agents having an augmented purity, i.e. having a purity of at least 85 weight percent, more preferably of 95 weight percent or more. It has been found that the use of coagulating agents having an augmented purity equally leads to augmented mechanical properties in the hardened construction material as well as to an acceleration of setting. In contrast, the use of coagulating agents having a reduced purity, i.e. having a purity of less than 85 weight percent, leads to a prolongation of the time during which the grout remains workable.

In a particular embodiment of the method according to the present invention, the coagulating agent in the construction material is present in less than 0.1 weight percent, preferably from 0.1 to 0.5 weight percent, with respect to the total dry weight of the mineral material or at least 1 weight percent, preferably 1 to 2 weight percent, with respect to the dry clay content.

In a particular embodiment of the method according to the present invention, where the dispersing agent is chosen amongst phosphates and the coagulating agent is chosen amongst inorganic salts having a divalent metallic cation, the molar ratio $Me^{2+}/PO_4^{3-}$ between the metal cation of the inorganic salt and the phosphate in the aqueous construction material grout is preferably greater than 2 or between 2 and 5, i.e. in general, the metallic cation of the inorganic salt is present in a molar excess with respect to the phosphate.

In a preferred embodiment of the present invention, where the dispersing agent is constituted at least a aqueous silicate solution of such as for example sodium silicate, i.e. soda silicate, the sodium silicate is present in a ratio of $Na_2O:SiO_2$ of greater than 1, more preferably in the range between 1 and 2.8. In particular in the case where the sodium silicate has a ratio of $Na_2O:SO_2$ the greater than 1, more preferably in the range between 1 and 2.8, is used as the coagulating agent, the dispersing agent is preferably a polyacrylate and more preferably chosen among sodium polyacrylate, ammonium polyacrylate or among mixtures thereof.

In a particular embodiment of the method according to the present invention, the construction material is a construction block, preferably in form of a parallelepiped such as bricks, in particular supporting bricks or other supporting elements such as a wall, a slab or a pillar.

The present invention provides furthermore a solid construction material obtained by the process according to anyone of the variants of the above method, having a compressive strength of at least 1.4 MPa, and more particularly of at least 3 MPa or from 3 to 10 MPa and essentially free of hydraulic binder. A compression strength in this range allows to produce construction blocks or vertical walls that are suitable for the construction of houses or buildings having up to four stories without having to revert to materials such as hydraulic binders and using a small quantity of additives such as the dispersing agent and the coagulating agent. It is important to mention that a compression strength of less than 1.4 MPa can be obtained after 24 hours of drying, which allows a construction progress with essentially the same pace as in the case where the used construction material is cement or concrete. The compression strength is measured using an apparatus "Unitronic Compression 50 kN/Tensile 25 kg" produced by MATEST on samples of 4×4×16 cm which are broken at 3 flexion points and then tested in uniaxial compression using a cell of 10 kN.

Thus, the obtained construction material is essentially free of hydraulic binder such as cement, lime or pozzolan, i.e. comprises less than 2 percent, less than 1 weight percent of hydraulic binder such as cement, lime or pozzolan, with respect to the total dry weight of the mineral material contained in the mineral fraction. In a preferred embodiment, the construction material obtained comprises less than 1 weight percent of cement with respect to the total dry weight of the mineral material contained in the mineral fraction.

In a preferred embodiment of the method according to the present invention, the addition of the dispersing agent and coagulating agent to finally obtain an aqueous construction material grout can be made simultaneously or by adding first the dispersant and then the coagulating agent.

In the case where the addition of the dispersing agent and the coagulating agent is made simultaneously, it is preferable to add the dispersing agent and the coagulating agent in solid form, i.e. in the form of particles such as for example powder, sand or granules.

However, in the case where the dispersing agent and the coagulating agent are added sequentially, i.e. first the dispersing agent and then the coagulating agent, it is preferable to add the dispersing agent, the coagulating agent or both in the form of an aqueous solution or dispersion in order to better control in terms of time the duration of workability and the onset of setting of the construction material grout.

EXAMPLES 1325 kg of sand, 509.33 kg of clay and 305.59 kg of water were mixed to obtain one cubic meter of grout in which the ratio of water/clay is 0.6 and the volume ratio of sand to clay is about 1.0.

The amount of additives added was varied to evaluate the effect of the dispersing agent and of the coagulating agent on the rheology and the setting of the grout. In the discussed case, the dispersing agent is sodium hexametaphosphate (NaHMP).

As can be seen on the graph of drawing 1, the increase of the amount of added dispersing agent to the grout leads to a decrease of the flowing threshold of the grout, which is also confirmed by an increase of the spread by 10% (0.2 weight percent of NaHMP with respect to the clay weight) to 40 cm (0.8 weight percent of NaHMP with respect to the clay weight) in an Abrams cone slump test.

As can be seen on the graph of drawing 2, the increase in the amount of coagulating agent added to the fluidized grout with 0.8 weight percent of dispersing agent, with respect to the clay weight, leads to an acceleration of the setting of the grout. It is useful to note that in drawing 2, the penetration height of 0 corresponds to the maximal penetration in the sense that where the VICAT needle penetrates to the bottom of the sample, that is to the height 0 of the sample. In the present case, the coagulating agent used is magnesium oxide. Without addition of magnesium oxide (molar ratio Mg:P=0) no solidification occurs. However, if magnesium oxide based coagulating agent is added, the setting is triggered and accelerated to as the molar ratio between magnesium and phosphate increases.

As can be seen on the photograph of drawing 3, without addition of coagulating agent based on magnesium oxide, a sample of the fluidized grout with 0.8 weight percent of dispersing agent that is removed from the mold collapses, even after 24 hours, while in the presence of a magnesium oxide based coagulating agent the sample holds in place.

As can be seen on the graph of drawing 4, the compression strength of 1 MPa, sufficient for removing from the mould a self-supporting wall, is reached after 24 or 48 hours when the fluidized grout with 0.8 weight percent of dispersing agent comprises a magnesium oxide based coagulant, while without the addition of magnesium oxide based coagulating agent, the grouts needs at least a week to reach a compression strength of one MPa. In practice, this means that the grouts obtained by the methods according to the present invention can be removed from the mould after 24 hours, which corresponds approximatively to the time needed for removing from a mould a conventional cement based grout. This therefore allows to substitute the conventional cement grouts, without loss of time, during construction work.

In conclusion, the addition of a coagulant leads to a rise in compression strength which allows to construct vertical self-supporting walls rapidly, since a sufficient strength is reached after 24 hours, and thus the self-supporting wall may be removed from the mold.

The invention claimed is:

1. A method for producing a solid construction material, the method comprising:
extracting a mineral fraction comprising argillaceous particles from a soil;
preparing a first aqueous grout from at least one part of the extracted mineral fraction;
adding a dispersing agent to the first aqueous grout to disperse the argillaceous particles there to obtain a second aqueous grout,
adding a coagulating agent to the second aqueous grout to agglomerate the argillaceous particles therein to obtain an aqueous construction material grout;
introducing the aqueous construction material grout into a formwork; and
allowing the evaporation of the water contained in the aqueous construction material grout to obtain the solid construction material,
wherein the solid construction material is a supporting element having a compressive strength of at least 1.4 MPa.

2. The method according to claim 1, wherein the supporting element is a wall, brick, slab or pillar.

3. The method according to claim 1, wherein the dispersing agent is selected from phosphates and polyacrylate salts.

4. The method according to claim 1, wherein the coagulating agent is an inorganic salt having a divalent metal cation of carbonate, chloride, nitrate, sulfate, oxide, or hydroxide.

5. The method according to claim 1, wherein the building material comprises at least 5% by weight of argillaceous particles, relative to the total dry weight of mineral material contained in the mineral fraction.

6. The method according to claim 1, wherein the building material comprises 0.4 to 2 wt % dispersing agent, based on the total dry weight of clays.

7. The method according to claim 1, wherein the construction material comprises at least 1% by weight of coagulating agent relative to the total dry weight of clays.

8. The method according to claim 1, wherein the aqueous construction material grout, at the time of introduction into the mold, contains 5 to 30% water.

9. The method according to claim 1, wherein the dispersing agent is a phosphate, the coagulating agent is an alkaline earth metal salt, and the molar ratio [$Me^{2+}/PO_4^{3-}$] the metal cation of the alkaline earth metal salt and the phosphate in the aqueous construction material grout is greater than 1.

10. The method according to claim 1, wherein the solid construction material is substantially free of a hydraulic binder.

11. The method according to claim 1, further comprising adjusting the granulometry of the extracted mineral fraction.

12. The method according to claim 11, wherein adjusting the granulometry comprises altering the clay, sand, gravel, or loam content of the extracted mineral fraction.

13. The method according to claim 3, wherein the polyacrylate salts are monovalent salts.

14. The method according to claim 1, wherein the coagulating agent is an alkaline earth metal salt of carbonate, chloride, nitrate, sulfate, oxide, or hydroxide.

15. The method according to claim 1, wherein the building material comprises 5 to 30% by weight of argillaceous particles relative to the total dry weight of mineral material contained in the mineral fraction.

16. The method according to claim 1, wherein the construction material comprises 1% to 2% by weight relative to the total dry weight of clays.

17. The method according to claim 9, wherein the molar ratio [$Me^{2+}/PO_4^{3-}$] of the metal cation of the alkaline earth metal salt and the phosphate in the aqueous construction material grout is between 2 and 5.

\* \* \* \* \*